Dec. 30, 1952        R. L. HARTWELL        2,623,918
BONDING DEVICE FOR LIGHTNING PROTECTION
Filed Nov. 29, 1949
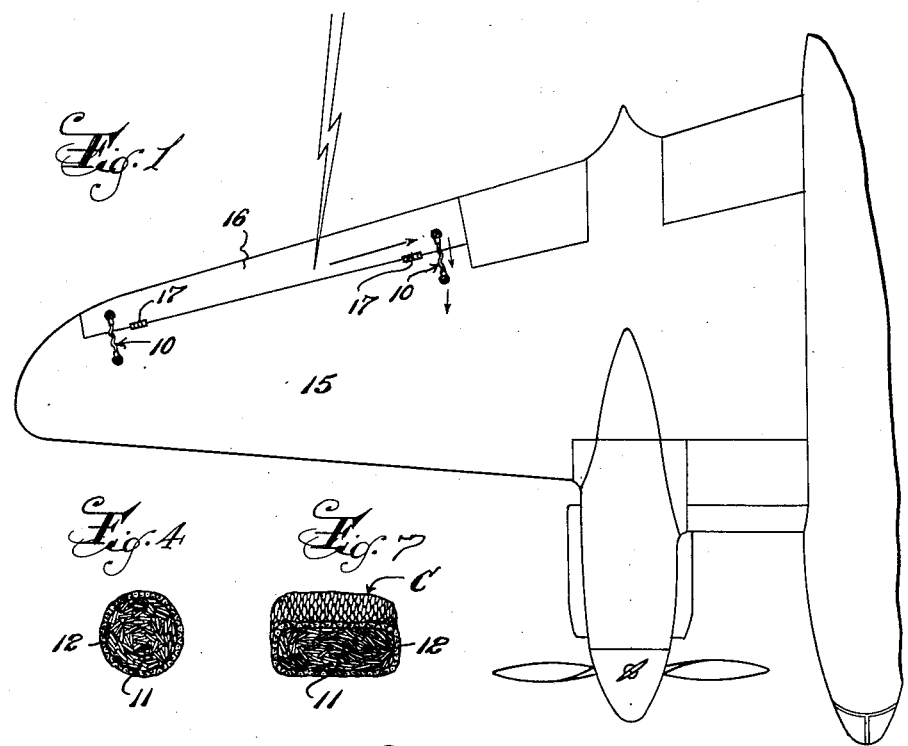
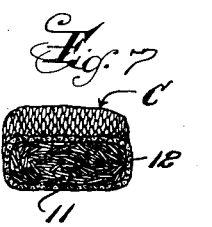
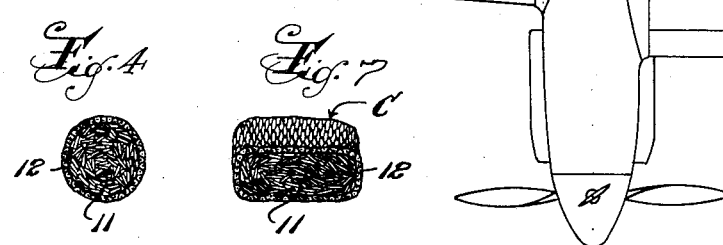
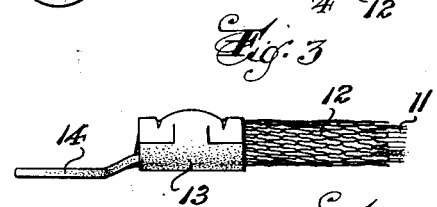
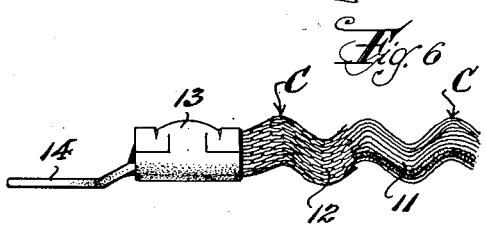
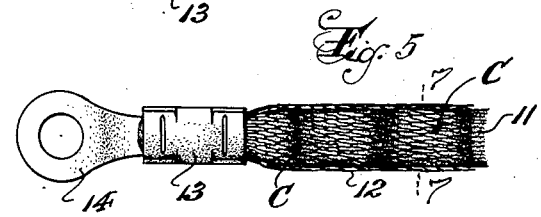
Inventor:
Ralf L. Hartwell,
BY George D. Richards
Attorney.

Patented Dec. 30, 1952

2,623,918

UNITED STATES PATENT OFFICE 2,623,918

BONDING DEVICE FOR LIGHTNING PROTECTION

Ralf L. Hartwell, Orange, N. J., assignor to Metal Textile Corporation, Roselle, N. J., a corporation of Delaware Application November 29, 1949, Serial No. 130,059

5 Claims. (Cl. 174—2)

This invention relates to improvements in devices for bonding various conductive parts of equipment served thereby against injury by high electrical current discharges, such as lightning strokes; the improved devices being especially well adapted for protection of aircraft structures from injury by lightning.

Aircraft flying under thunder-storm conditions are likely to intercept a lightning discharge. The effects of such charge upon the aircraft involve considerable risk of injury to the structure, such as impairing the mobility of the control surface members, damaging radio and antenna equipment, burning and pitting of the skin of the aircraft, and even the possibility of producing transient voltages which could be a source of spark and consequent fire hazard, as well as danger to the occupants. The purpose of bonding therefore is to provide means of such current capacity that a lightning discharge current can be safely carried between any two extremities of the aircraft without risk of damage to the structure or of producing excessive voltages within the aircraft.

An example of one way an aircraft can be crippled by a lightning discharge is the immobilization or freezing of control surface members (ailerons, stabilizers or rudders) by the effects of the passage of lightning current through the hinges of such members. The amount of current which can be safely carried by the hinges is very small, and it has been noted that currents of the magnitude of 40,000 amperes have resulted in the freezing of such hinges. The risk of freezing is therefore great, since a lightning charge frequently reaches a crest value of 100,000 amperes at 10 microseconds and drops to 50,000 amperes at 20 microseconds. The term "freezing" does not necessarily mean actual welding action upon the hinge parts, but includes any pitting or deformation of said parts which tends to bind the same against free movement.

The above referred to "freezing" effects may be avoided, it has been found, by provision of bonding devices or connectors attached to and between the control surface member and the body to which it is hinged, so that said bonding devices or connectors bridge the hinges; said bonding devices or connectors being of circular mil cross-sectional area suitably predetermined to carry an ampere surge of a crest value of 100,000 amperes at 10 microseconds. The bonding devices or connectors, when so applied, will bypass the current surge around the hinges, and thus risk of freezing or other injury thereto is avoided.

Bonding devices or connectors for the above stated purposes, as heretofore provided, have generally been of two forms; one consisting of stranded wire cable, and the other comprising a braided wire formation or strip. One of the effects of a heavy current surge through a bonding device or connector comprising a plurality of wire strands is the tendency to forcibly draw together or compress the wire strand assembly. This effect upon a stranded wire cable type of device causes the same to stiffen and thus to substantially reduce its flexibility, and in the braided wire type to likewise stiffen the same and thus reduce its flexibility. Such stiffening and resultant loss of flexibility causes the device or connector to offer impedance to the mobility of control surface members with which it is connected. In addition to this, such stiffening both impairs the fatigue resistance properties of the device or connector and increases likelihood of crystallization of the metal thereof, with attendant risk of wire strand breakage and consequent projection of free wire ends which form discharge points for sparks or arcing with resultant fire hazard. Another disadvantage, incident to both said types of bonding devices or connectors, is the fact that on forcible compression of contiguous wire strands thereof, under the influence of high current surge therethrough, the effect is to tighten the twists of the cable strands, and to tighten the junctures of the interwoven and crossed wire strands of the braided formation, which tightening subjects the strands to shearing stresses with consequent weakening thereof, and thus further reducing fatigue resistance with increased hazard of strand breakage.

Having the above in view, it is an object of this invention to provide a novel construction of bonding device or connector of such character that tendency thereof to stiffen under compression induced by high current surge therethrough is substantially avoided, so that its flexibility is not impaired; to avoid shearing action of one wire strand upon another, and thus to eliminate risk of wire strand breakage; to provide a structure which possesses and retains high fatigue resistance; and generally to improve the efficiency and length of useful life of the device or connector.

Illustrative embodiments of this invention are shown in the accompanying drawings in which:

Fig. 1 is a fragmentary top plan view of an aeroplane showing the application of bonding or connecting devices according to this invention between a wing and aileron thereof, so as to protect the pivoting hinge connections of the latter against injury by a traversing high current discharge.

Fig. 2 is a top plan view of bonding device or connector made according to this invention, with parts broken away; Fig. 3 is a side elevational view of the same; and Fig. 4 is a cross-sectional view, taken on line 4—4 in Fig. 2, but drawn on an enlarged scale.

Fig. 5 is a top plan view, similar to that of Fig. 1, but showing a modified form of construction; Fig. 6 is a side elevational view of the same; and Fig. 7 is a cross-sectional view, taken on line 7—7 but drawn on an enlarged scale.

The reference character 10 indicates the complete bonding device or connector of this invention, the same comprising a main surge current conducting body 11 of suitable length formed by a multiplicity of highly flexible strands or filaments of flat or ribbonlike wires, laid side by side in straight linearly parallel relation one to another in the assembly thereof. The strands are preferably produced from copper or tinned copper wire flattened to ribbonlike form. The assembly of wire strands thus forming the body 11 are provided in sufficient number to furnish a body of such circular mils cross-sectional area as will carry a surge current such as released by a lightning stroke. Generally a cross-sectional area of from 6000 to 8000 circular mils will give satisfactory service. The assembly of parallel wire strands which form the body 11 is enclosed in an external retaining cover or sleeve 12 which is made from tubular knitted wire mesh and which closely fits body 11 in electrical contact therewith, as shown. Said cover or sleeve functions to retain the multiplicity of wire strands in the required parellel assembled relation, and yet so as not to reduce the flexibility of the body 11 formed thereof, since the knitted structure of said cover or sleeve, by reason of the loose interlinking of its knit loops, itself possesses a high degree of flexibility. The cover or sleeve is preferably knitted from a nickel alloy (known to trade under the name of "Monel") wire, for the reason that wire of such alloy not only possesses adequate strength and good corrosion resistance properties, but also possesses relatively high electrical resistance compared to copper, and consequently does not tend to carry current in amount likely to produce shear effects at the loop bights of the knitted metallic fabric. Opposite end portions of the body 11 and its enclosing cover or sleeve 12 are respectively enclosed and suitably secured within metallic clamping ferrules or thimbles 13, from the outer ends of which extend perforate terminal lugs 14.

Bolts or similar fastening devices can be engaged through the terminal lugs 14, whereby to secure the respective ends of the bonding device or connector mechanically and in electric contact with the particular structural parts between which the device or connector is desired to extend. For example, as shown in Fig. 1, one end of the device or connector is secured to the wing 15 of an aeroplane and its opposite end to the aileron 16 thereof, adjacent hinge connections 17 between these parts, thus being disposed to protect the hinge connections from damaging effects of a high current surge or discharge.

It will be obvious that, with respect to the novel bonding device or connector according to this invention, since the wire strands of the body 11 are of flat ribbonlike form and lie in contiguous longitudinally parallel relation and substantially disposed so that they bend in the plane of their width, the body will possess a high degree of flexibility, and therefore not only will the flat strands flex freely, but with much less fatigue than would be the case if the strands comprised round wire. Furthermore, when the body 11 of flat ribbonlike wire strands is subjected to the compressive force of surge currents, the flat surfaces of the strands will be pressed together without shearing effect, and yet, even when thus compressed, with less stiffening and reduction of flexibility. Also, since the flat ribbonlike wire strands of the body 11 lie in parallel relation, twisted, spiral or interweaving intersection thereof is avoided, and consequently excessive working of the metal with risk of crystallization is likewise avoided. Being free from twisted, spiral or interweaving turns, the strands of the body 11 provide a shorter path for surge currents, thus permitting the use of less material, or giving lower resistance if the same number of circular mils cross-sectional area is provided as in stranded cable or braided wire bonding devices or connectors.

The knitted metallic cover or sleeve 12 also serves as a guard to prevent projection of wire points, in event of strand breakage, which points, if externally projected, would form foci for sparking discharges or arcs.

Another advantage inherent in the novel bonding device or connector of this invention is that its structure provides for more efficient heat dissipation, since its flat ribbonlike wire strands provide more surface in relation to conducting area, and more space is provided for air circulation between surfaces. If subjected to repeated pulses of high current, the superior heat dissipation of the greater surface area could become important. The flat ribbonlike form of the wire strands also provides better electrical contact between the body and its terminal attachments.

In Figs. 5 to 7 inclusive there is shown a modified form of the bonding device or connector of this invention; in make-up and character of its constituent parts it is the same as already above described, but the main surge current conducting body 11 and the enveloping retaining cover sleeve 12, instead of being of the straight form of the first described embodiment, are crimped or corrugated to provide a series of longitudinally extending transverse crimps or corrugations C. These crimps or corrugations cushion elongation effects upon the body of the force of surge currents, and further assure flexibility of the body when it is subjected to such current surge force.

Having now described my invention, I claim:
1. A bonding device for aircraft lightning protection comprising a lightning current surge conductive body formed by a multiplicity of ribbonlike metallic filaments of high electrical conductivity and of individually highly flexible character, said multiplicity of filaments being disposed side by side in straight linearly parallel relation and loosely compacted laterally in such quantity as to provide the body mass formed thereby with a substantial cross-sectional area, a cover sleeve of tubular knit metallic mesh enveloping the assemblage of metallic filaments, whereby to retain the same in said body forming relation, said cover sleeve, by reason of the loose linkage of its knit loops, being readily and conformably yieldable to flexing movements of the body enclosed therein, and metallic terminal elements respectively attached in mechanically and electrically bound connection with the opposite end portions of the cover sleeve enveloped body.

2. A bonding device for aircraft lightning protection according to claim 1 wherein the cover sleeve comprises a metal of higher electrical resistance than that of the metallic filaments of the body, whereby said body provides a path of lower resistance for a surge current than does said cover sleeve so that the latter will not carry a load sufficient to risk shearing of its mesh loops.

3. A bonding device for aircraft lightning protection according to claim 1 wherein the filaments of the body are produced from copper and the tubular knit wire of the cover sleeve is produced from nickel alloy.

4. A bonding device for aircraft lightning protection according to claim 1 wherein the body and its cover sleeve are transversely crimped to provide a bonding device of longitudinally undulant formation.

5. A bonding device for aircraft lightning protection according to claim 1 wherein the body forming filaments are accumulated in such quantity as to provide the mass thereof with a cross-sectional area of from 6000 to 8000 circular mils.

RALF L. HARTWELL.

REFERENCES CITED

The following references are of record in the file of this patent:

UNITED STATES PATENTS

| Number | Name | Date |
|---|---|---|
| 271,262 | Patterson | Jan. 30, 1883 |
| 289,092 | Halkyard | Nov. 27, 1883 |
| 642,553 | Mayer | Jan. 30, 1900 |
| 2,129,493 | Deems | Sept. 6, 1938 |
| 2,337,556 | Hosking | Dec. 28, 1943 |
| 2,347,713 | Rogoff | May 2, 1944 |
| 2,522,879 | Lindenblad | Sept. 19, 1950 |

FOREIGN PATENTS

| Number | Country | Date |
|---|---|---|
| 23,658 | Great Britain | Oct. 21, 1893 |